P. H. MUELLER & L. H. SCHULER.
INTERNAL COMBUSTION ENGINE.
APPLICATION FILED MAY 5, 1913.

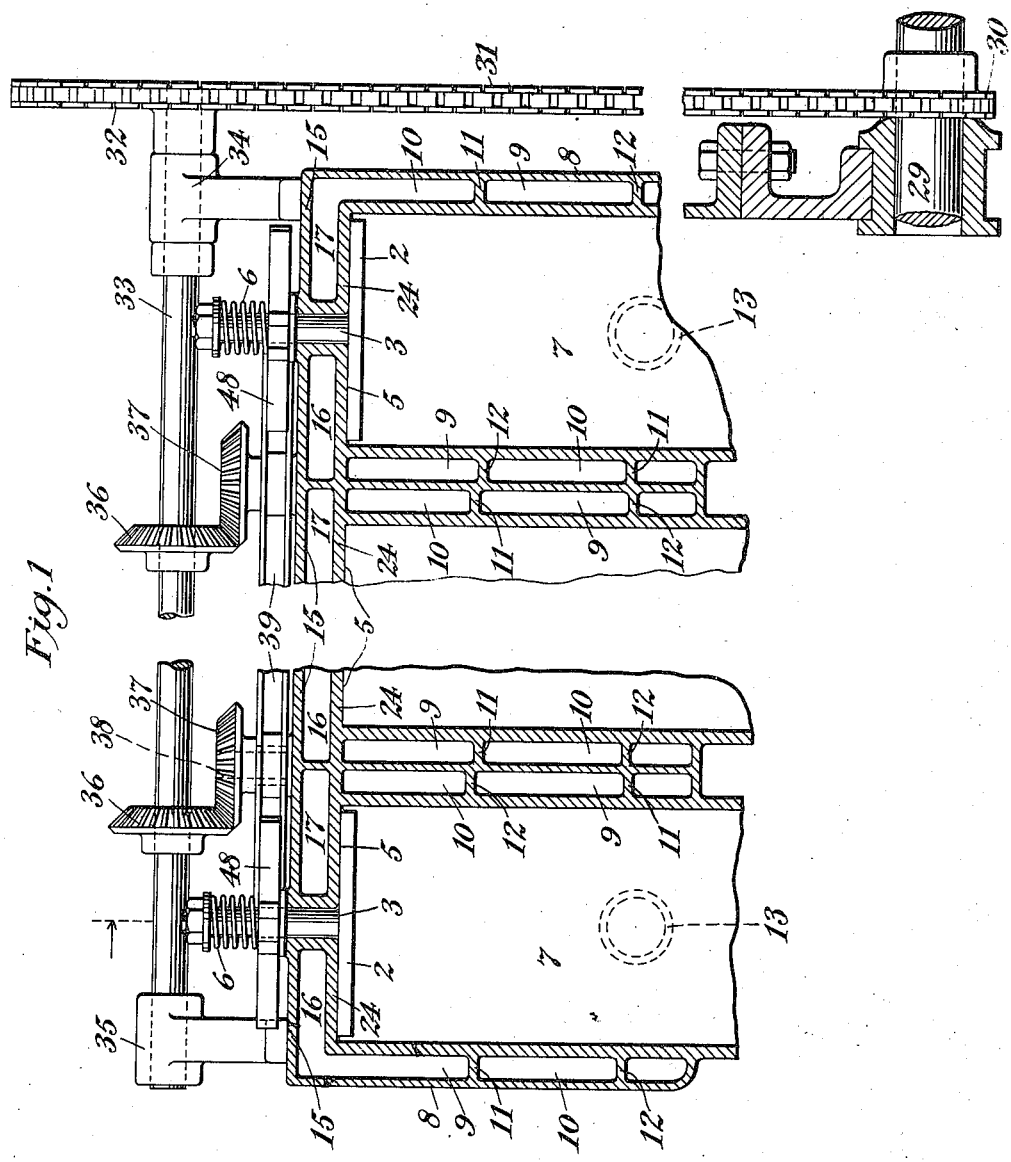

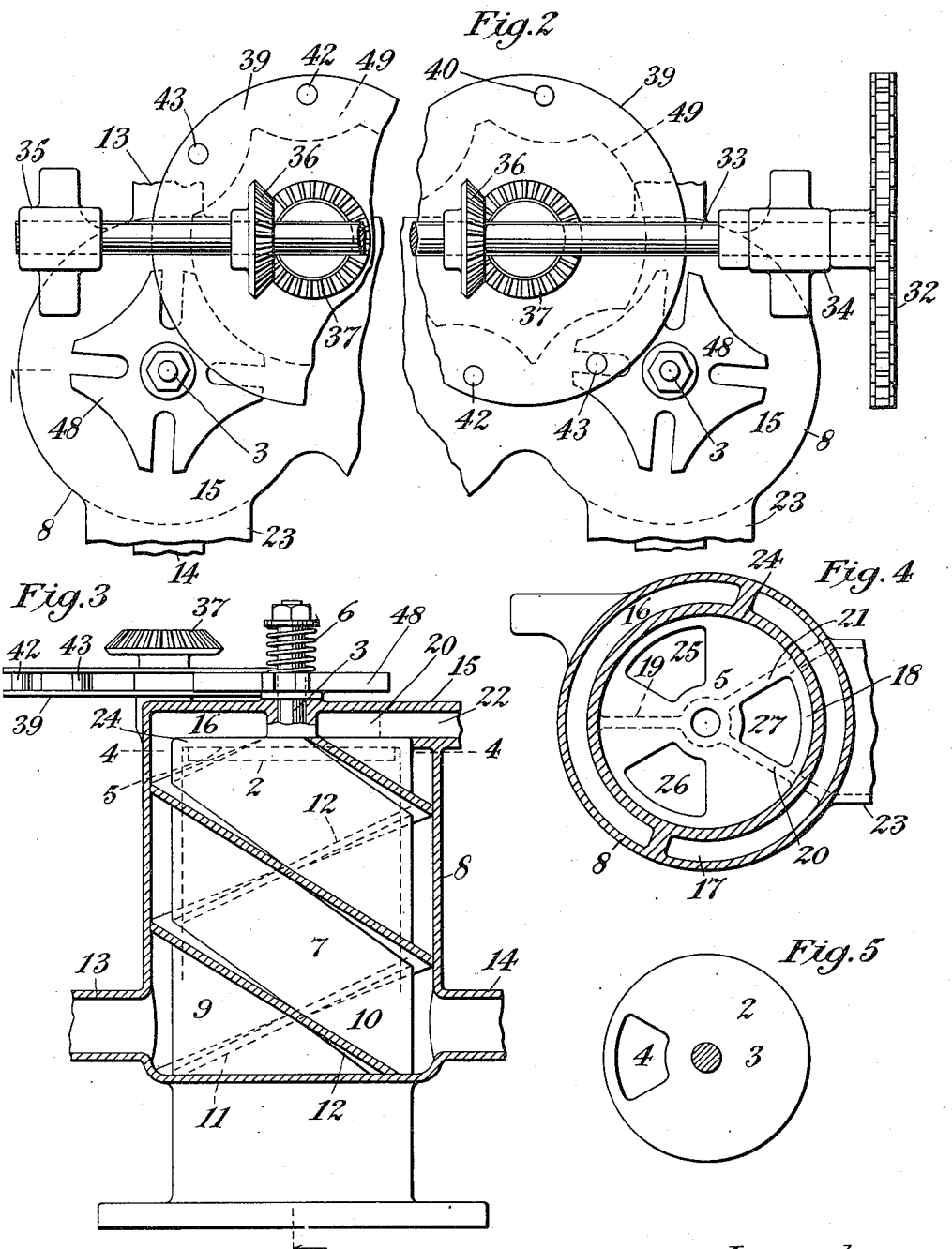

1,218,687.

Patented Mar. 13, 1917.
3 SHEETS—SHEET 3.

Witnesses:

Inventors
Paul H. Mueller
and Ludwig H. Schuler
by
Attorney.

UNITED STATES PATENT OFFICE.

PAUL H. MUELLER AND LUDWIG H. SCHULER, OF BROOKLYN, NEW YORK, ASSIGNORS TO L-M-S MOTOR CO., A CORPORATION OF NEW YORK.

INTERNAL-COMBUSTION ENGINE.

1,218,687. Specification of Letters Patent. Patented Mar. 13, 1917.

Application filed May 5, 1913. Serial No. 765,720.

*To all whom it may concern:*

Be it known that we, PAUL H. MUELLER and LUDWIG H SCHULER, subjects of Germany, and residents, respectively, of Brooklyn, in the county of Kings and State of New York, have invented certain new and useful Improvements in Internal-Combustion Engines, of which the following is a specification.

This invention relates to improvements in internal combustion engines, and the principal object of the invention is to produce an engine of this type which will be air cooled and of high efficiency. In order to produce these results we embody our invention in a six-cycle engine having the normal four cycles or periods of admission, compression, explosion and exhaust, and in addition thereto and following them, two further cycles or periods, corresponding to an additional in and out stroke of a piston, for drawing in a cooling charge of air and then expelling the same together with the residual gases in the cylinder on the return stroke of such piston. This six-cycle action just described is preferably embodied in an engine of the general type disclosed in our prior applications Serial Nos. 670,141, filed January 9, 1912 and 708,146, filed July 9, 1912, in each of which we have illustrated a type of engine having a single rotary valve controlling both admission and exhaust, and the operation of which is so controlled that it has no movement either when exposed to the pressure of a charge in the cylinder during the compression period or when subjected to the pressure developed in such cylinder on the ignition or explosion of a charge. As we have found an engine of the general type disclosed in our aforesaid prior applications, to wit, one having a single rotary valve controlling both admission and exhaust, to be simple and efficient in action, we have combined the two principal features just described, to wit, the employment of the six-cycle principle and the use of a single rotary valve controlling both admission and exhaust, in the preferred embodiment of the present invention, and we have therefore illustrated an engine so constructed.

The principal feature of the engine disclosed in our prior application, Serial No. 708,146 is the modification of the cycle of operations of the engine by the employment of a single valve—preferably a rotary disk valve—which is stationary for a considerable period of time both during the period of admission and during the period of exhaust, for the purpose of admitting a charge of large volume rapidly and for the purpose of permitting the rapid escape of the burned gases, etc., that is, their escape through a port or ports of large area. This feature of said invention is also retained in the present case, and our improved six-cycle engine, in the preferred construction, is one in which not only are there the ordinary four cycles or periods of admission, compression, explosion and exhaust and two additional cycles or periods for the admission and discharge of a charge of air only for cooling and scavenging purposes, etc., but is one in which each admission port is wide open for a considerable time during the period of admission and the exhaust port is open for a considerable time during the period of exhaust. Moreover, this feature of providing a port or ports wide open for a considerable length of time is also preferably applied to the fifth and sixth cycles or periods of operation of the engine, in order that a charge of air of large volume and consequent great capacity for cooling and scavenging purposes may be drawn into the cylinder during the fifth stroke of the piston in the cycle of operations and quickly and fully expelled, together with the residual exhaust gases, during the sixth period. There results from organizing the parts in the manner just described a six-cycle internal combustion engine in which a single valve, the operation of which is unaffected by any pressure exerted or developed in the cylinder, may, and in the engine shown does, control every port through which a combustible mixture or air only enters or leaves the engine cylinder at any time during the cycle of operations of the engine.

Other features of the invention not hereinbefore referred to will be hereinafter described and claimed, and are illustrated in the accompanying drawings, in which—

Figure 1 is a substantially central, vertical, longitudinal section and elevation of so much of a multi-cylinder internal combustion engine of the type hereinbefore described as is necessary for the purpose of illustrating the application of our present invention thereto, this view being broken in the middle and showing only the terminal cylinders of what is intended to be a six-cylinder engine;

Fig. 2 is a plan of the same;

Fig. 3 is a central, vertical, transverse section of one of the cylinders and other parts shown in Figs. 1 and 2;

Fig. 4 is a horizontal section and underside view of one of said cylinders, the section being taken in line 4—4, Fig. 3;

Figure 6:
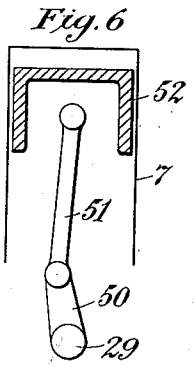

Fig. 5 is a sectional plan of a rotary disk valve employed in said engine, the section being taken substantially in the line of the upper face of the valve, and Figs. 6—7, 8—9, 10—11, 12—13, 14—15 and 16—17 are details showing, in the even numbered views in vertical section and elevation, and in the odd numbered views in plan, successive positions of the crank, the piston and the valve mechanism of a single cylinder, illustrating the main positions of these parts in the cycle of operations of our six-cycle engine, each pair of odd and even numbered views illustrating a single positioning of said parts.

Similar characters designate like parts in all the figures of the drawings.

As in the case of the inventions disclosed in our aforesaid prior applications, our present invention may be applied to various kinds of internal combustion engines, stationary or movable, and it is to be understood that the particular engine shown in the drawings is merely illustrative of one mechanism in which the invention may be embodied. The engine shown is a six-cycle engine intended to have also six cylinders, and, in order to illustrate the application to such engine of the preferred means for controlling its operation, we have illustrated in connection with it, as before indicated, a valve mechanism of the rotary single valve type in which one rotary disk-valve controls the admission and exhaust of a combustible charge and burned gases, and also the admission and discharge of the cooling and scavenging charge of air.

The admission and exhaust ports leading to and from each of the cylinders of the engine may be located at any suitable points and may coöperate with the valve mechanism in any proper manner so long as these inlet and outlet ports for each cylinder are all controlled by the same valve. The construction shown is one in which a single valve, which is preferably of the rotary disk type, is, as in our aforesaid applications, located in the explosion chamber of the engine cylinder in contact with a suitable seat against which it is held by any pressure exerted or developed in the cylinder. The controlling means employed in connection with the cylinder and piston may of course be any suitable for the purpose of admitting and discharging combustible and burned gases and atmospheric air in the manner before described, but in the construction illustrated it embodies a valve of the kind just described and suitable means for so operating said valve that there is not only no pressure on the valve during its usual partial rotary movements, but the valve will be stationary during the admission and discharge of the charge of air for cooling and scavenging the cylinder. The movements of the valve and the other parts of the controlling means will preferably be derived from power developed in the engine, and usually directly from the main crank-shaft. The movement of the valve will not be a continuous one but will be intermittent as in the aforesaid applications. The specific valve illustrated is a rotary disk-valve, 2, having a stem, 3, by means of which it may be operatively connected with means for actuating or turning the valve. In this case said valve has a single port, 4, through which admission of the usual combustible charge or exhaust of the burned gases, etc., takes place according to the position of the valve, and through which also, in other positions of the valve, the admission and discharge of a cooling charge of air takes place. This port 4 is so positioned and shaped as to coöperate with fixed inlet and outlet, or admission and exhaust, ports of the cylinder. In all positions thereof the valve 2 is held against a seat, which is here shown as the inner wall, 5, at the upper end of the cylinder space; and substantially the whole back wall of the valve is illustrated as shaped to fit this seat and lie snugly against it. The seating of the valve is assisted in the present case, as in our former applications, by means of a spring, such as 6, working between suitable stops outside the cylinder itself. Here the stem 3 is shown as journaled in a bearing in the upper end of the cylinder and in a casing or jacket surrounding said cylinder, and projects outside said cylinder and casing or jacket into position for connection with suitable means for actuating the valve and its stem.

The cylinder is substantially of the usual type and is designated herein by 7. It will of course have suitable inlet and outlet ports for the admission of a combustible charge and the discharge of the burned gases, etc., remaining after the ignition, and in addition thereto should have, in the present case, another inlet for the admission of a cooling and scavenging charge of air which will ordinarily be admitted directly from the atmosphere. While the reduction of the temperature of the cylinder by the admission of a cooling charge of air after the ignition or explosion of one charge, and prior to the ignition or explosion of the next succeeding charge, is one of the main objects of the present invention, we deem it desirable also to utilize the cooling action of the air before it is admitted into the cylinder to assist in the cooling of said cylinder; and we also prefer to utilize the combustible charge or mixture in substantially the same manner. For these reasons we employ, in connection with each cylinder and surrounding the same, an air jacket through which air only or a combustible mixture of air and hydrocarbon, etc., or both, may be circulated in contact with the outer wall of such cylinder before such air or mixture, as the case may be, enters the cylinder itself and comes in contact with the inner wall thereof. In other words, we prefer to abstract from the walls of the cylinder as much as possible of the heat developed as a result of the explosion of each charge, and to do this by circulating a cooling charge of air or combustible, or both, around the outside of each cylinder before it enters the cylinder and also, of course, to circulate it from one end of the cylinder to the other in contact with the walls thereof as it is drawn in by the in-stroke of the piston. We have therefore combined with each cylinder a suitable air jacket having in it different paths for the flow of air and combustible respectively, this air jacket comprising a casing or cylinder, 8, surrounding the engine cylinder 7 and spaced at a proper distance therefrom, and having between its inner wall and the outer wall of the cylinder 7 two independent paths, one, 9, for air only and the other, 10, for a combustible charge only, which paths are formed in this case by two spirals, 11 and 12, winding around said cylinder from suitable points of inlet, such as 13 and 14, for the air and combustible respectively, to the upper end of the cylinder 7, where a horizontal extension, 15, of the jacket 8 is illustrated as disposed immediately above the disk-valve 2 and as divided into three compartments or spaces, one of which is a space for the admission and discharge of air only, another of which is a space for the admission of a combustible charge only, and the third of which is a space provided for the exhaust of the burned gases, etc. These three sections or spaces of the extension 15 of the jacket 8 are indicated respectively by 16, 17 and 18, the section or space 16 being that for the admission or discharge of air only, while 17 is for the admission of a combustible charge only, and the section 18 is the exhaust space for the discharge of the burned gases resulting from the ignition of a charge. These three sections or spaces in the chamber 15 are formed by vertical ribs or partitions, 19, 20 and 21, (see Fig. 4) between the upper wall or jacket wall proper of the chamber 15 and the upper wall or head of the engine cylinder 7. As will be seen, the spiral passages 9 and 10 lead directly into the sections 16 and 17 respectively, corresponding to the air and combustion supplies, and do not have any outlets through the outer wall of the jacket. The space 18, however, which represents the exhaust or discharge portion of the chamber 15, does not communicate with either of the spiral passages 9 and 10 but has an outlet through the outer wall of the air jacket 8, as indicated at 22, a relatively large exhaust connection being shown at 23 capable of receiving a large volume of air or other gas.

It will be seen that each of the two admission spaces 16 and 17 for air and combustible respectively extends about the axis of movement of the valve 2 through an arc of relatively great length, and that the space 18 for the discharge of burned products, etc., is defined by a relatively short arc, which, however, is sufficient to permit proper coöperation of the valve with the exhaust port in an engine of the type illustrated. It is important that the port 4 in the valve 2 shall coöperate properly with openings through the cylinder wall or head, 24, at the different points in the cycle of movements of said valve. Ports 25, 26, and 27 are shown in said cylinder head or wall for permitting communication through them at the proper times, and through the valve-port 4 properly positioned with respect thereto, with the interior of the cylinder 7. These openings 25, 26 and 27 are here illustrated as substantially equidistant from one another and as of substantially the same size and shape, being so formed and located as to coöperate properly with the similarly formed and located valve-port 4 to uncover the same at the desired times.

The means for actuating each valve 2 of an engine cylinder, for the purpose of carrying its port 4 through its proper cycle of movement, may be any suitable for the purpose. It is preferably means for intermittently rotating said disk-valve in substantially the manner disclosed in our aforesaid application, Serial No. 708,146. The means illustrated comprises power-transmitting chain-gearing connecting the main crank-shaft, 29, of the engine with the stem 3 of each valve. The particular connections used may be varied considerably but those illustrated constitute a simple means for imparting the necessary intermittent movements to the valves with dwells during each period of admission or discharge, whether of a combustible charge or a charge of air for cooling each cylinder. The transmitting mechanism illustrated comprises a small sprocket-wheel, 30, secured to the crank-shaft 29, a sprocket-chain, 31, and a larger sprocket-wheel, 32, around which said chain passes at its upper end and which is secured to an upper horizontal shaft, 33, journaled in bearings, such as 34 and 35, bevel-gears, 36, secured to said shaft 33 (usually one for each pair of cylinders) bevel-gears, 37, meshing with the bevel-gears 36, and mounted to turn on vertical carriers or studs, such as 38, and suitable connections between the bevel-gears 37 and the stems 3 of the valves for operating said valves in the proper timing and with the desired intermittent movements and dwells before mentioned.

The connections between the bevel-gears 37 and the valve-stems may be any suitable for obtaining the movements specified. Preferably each connection will, however, be of the type shown, that is to say, each will involve a Geneva movement between the bevel-gear 37 and the stem of each valve, the construction illustrated being one in which an actuator and stop wheel of a modified form of Geneva movement is common to two separate Geneva wheels. The actuators and stop wheels, as here shown, are suitably modified to adapt each for coöperation with two different Geneva-wheels. The combined actuator and stop-wheel illustrated has four separate actuating pins and four recesses. Each combined actuator and stop-wheel is designated generally by 39. The four pins just referred to are indicated at 40, 41, 42 and 43, and the recesses at 44, 45, 46 and 47. The Geneva wheels which the pins 40—43 are intended to drive are indicated at 48. Each is secured to the valve-stem which it is intended to drive in such a manner that the stem and the Geneva wheel will always rotate in unison while the stem may have a movement in the direction of its axis independent of the Geneva wheel. Each of the Geneva wheels is held against its seat 5 at the upper end of its cylinder by the spring 6 before described. The recesses 44—47 and the peripheral stop-face 49 of each stop-wheel are so proportioned and associated in such a manner with the two Geneva wheels coöperative therewith and with the actuating pins 40—43 that each Geneva wheel—and hence each valve—is operated intermittently not only during admission of a combustible charge and exhaust of the burned gases or products of combustion, but also during admission of a cooling charge of air and discharge of such air admixed with the residual gases or waste products. Moreover, these parts are so organized and combined that each valve is locked against movement intermittently, that is to say, throughout compression and explosion, and also held against movement for a considerable period of time during admission of a charge and exhaust of the burned gases, etc., and during admission and discharge of a charge of air only. The relation of all the parts of the engine is such that the cycle of each valve is the same for each cylinder, but the movements of the valves for the different cylinders of course differ in phase.

In the six-cycle, six-cylinder engine shown and described herein the ratio of movement of the crank-shaft 29 to each valve and valve-stem is intended to be three to one, and the crank-shaft will make three complete rotations while the controlling means before described is coöperating with the cylinder and piston to produce one complete cycle of operations of the valve for three in-strokes and three out-strokes of the piston. The cycle of each combined actuator and stop-wheel 39 is as a whole the same as that of the valve, that is to say, said wheel makes one complete rotation while the valve is making one complete rotation, but the actuator and wheel 39 rotates continuously and the valve turns intermittently and is stopped not only after admission, exhaust, etc., and locked in the stopped position, but is also stopped for a considerable period of time during admission, exhaust, etc. The cycle of the wheel 39 may be divided into six equal parts, each angle of sixty degrees of movement corresponding to one of the six periods of our six-cycle engine. The first of these six periods represents admission of the combustible charge, the second corresponds to the compression of said charge, the third, to the ignition or explosion of the charge, the fourth, to the exhaust of the burned gases or products of combustion, the fifth, to the admission through the inlet 13 and the spiral passage connected therewith, and thence through the same port 4 in the valve through which admission of the combustible charge takes place, of a charge of atmospheric air sufficient for cooling the walls, both external and internal, of the cylinder and reducing the cylinder temperature to the desired extent, while the sixth corresponds to the period during which said charge of air admixed with the residual gases or products of combustion is expelled from the cylinder by the last piston-stroke of the cycle. By properly locating or varying the positions of the pins 40—43, etc., the intermittent movements of each valve may be varied within quite wide limits. In the construction illustrated the parts are so combined that each Geneva wheel begins to turn its valve to admit the charge at the desired point in the cycle of operations and continues to move, together with its valve, until the port 4 is wide open and in communication with the inlet space 17 for the fuel supply through the corresponding fuel inlet port 26. In this case said port remains wide open and the valve and Geneva-wheel stationary during twenty degrees of the movement of the combined actuator and stop-wheel 39. Thereafter the Geneva wheel is again engaged and actuated by the wheel 39 and turned until the admission port 26 for the combustible charge is closed again, whereupon the valve and the Geneva-wheel will become stationary again and will remain stationary throughout the periods of compression and explosion of said charge. On the completion of the period of explosion the Geneva-wheel will again be engaged at the proper time by the wheel 39 and turned again to bring the valve-port 4 into communication with the exhaust-port 27 to permit the discharge of the burned gases and other products of combustion. In this case when the port 4 is fully uncovered by the port 27 the valve will stop again and remain stationary for approximately forty degrees of the movement of the wheel 39, during which time, of course, the pins of the wheel 39 will be out of engagement with the Geneva-wheel. At the end of the period of forty degrees during which the valve is stationary in a wide open position the valve will begin to move again and its port will gradually be covered until communication with the exhaust is shut off again. In the construction illustrated approximately 100 degrees of movement of the wheel 39 is required to fully open or close either the admission or the exhaust port, but this arc of movement can be increased or decreased as desired (within limits). On the completion of the closing of communication to the exhaust the wheel 39 at the proper point again engages and turns the Geneva-wheel and the valve to bring the valve opening 4 into communication with the port 25 through which air only is admitted to the cylinder. As the piston moves in on the fifth period of the cycle of operations it begins to draw in air through the ports and passages 13, 9, 25 and 4 and will continue to do so until it reaches the end of its in-stroke, whereupon it will begin to force it out again, together with the residual products of combustion. The movement of the valve during these two piston-strokes is also variable, as it is during the admission of the fuel charge. It is held stationary after reaching its wide open position for approximately 160 degrees of the movement of the wheel 39 and is then gradually closed during the last part of the sixth period of the cycle of the engine. On the last piston-stroke of the cycle, and near the end thereof, the valve is operated again by the wheel 39 and turned to close the air-inlet 25 and later, at the proper point, to open the admission port 26 for another fuel charge.

Figure 8:
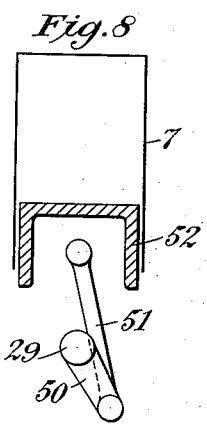
Figure 10:
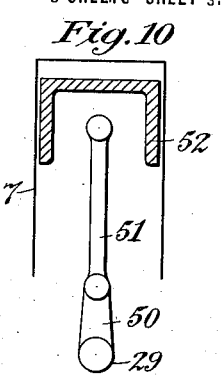
Figures 7, 9, 11:
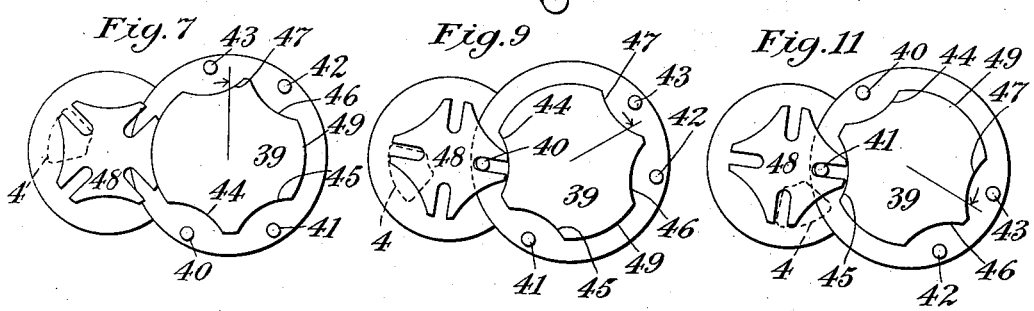
Figure 12:
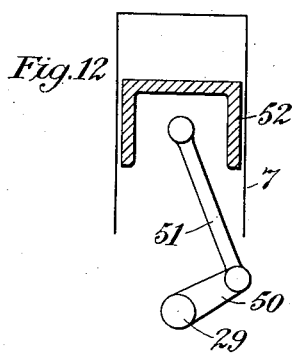
Figure 14:
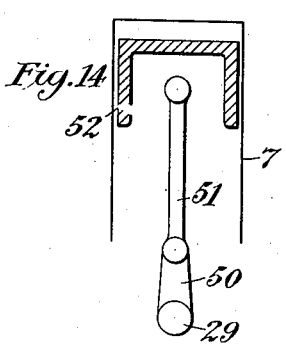
Figure 16:
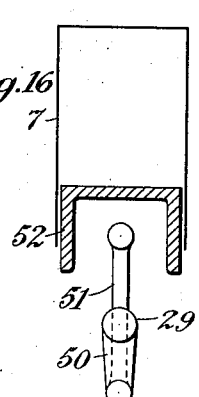
Figure 13:
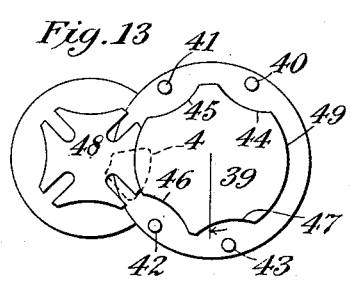
Figure 15:
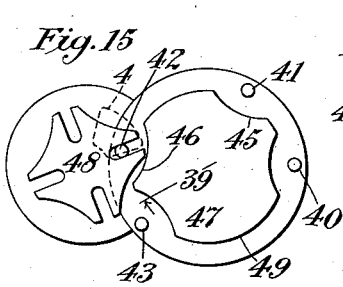
Figure 17:
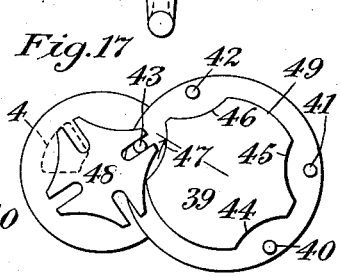

In Figs. 6 to 17 inclusive we have illustrated some of the principal positions of the parts at different points in the cycle of operations, Figs. 6 and 7 being corresponding views showing, in the former, the position of the crank, 50, the piston-rod, 51, and the piston, 52, when the parts are at the firing point, that is, at the beginning of the explosion period of the cycle. Fig. 7 shows the positions of the actuating-wheel and pins and the Geneva-wheel, the valve-port, etc., at this time. Figs. 8 and 9 show the positions of these parts when the exhaust port is about half open. In a similar way Figs. 10 and 11 illustrate the positions of the parts when the exhaust port is closed. Figs. 12 and 13 show the positions of the parts during the fifth cycle, with communication open to the air inlet 13 for admitting air for cooling and scavenging the cylinder, while Figs. 14 and 15 show the position of the valve inlet in a state of rest when it reaches a point between the closing of communication to the air inlet 13 and the opening of communication with the fuel inlet 14. Figs. 16 and 17 show the positions of these parts just after a charge of combustible mixture has been drawn into the cylinder from the fuel inlet 14 through the admission port 26, and just prior to the return of the piston for the compression of such charge, communication with the inlet 14 being closed at this time.

The various parts of, or coöperating with, each of the cylinders not hereinbefore specifically referred to are similar to those hereinbefore described and are designated by corresponding reference characters. Substantially the only difference between the parts shown at the left and at the right in Fig. 1 is that the valve and its gear at the right in said figure are driven from the opposite side of the actuator 39 from that at which the valve at the left in said figure is driven.

With an engine operating on the cycle just described it will be seen that not only is the cylinder air cooled but that it is air cooled both etxernally and internally by the flow of a cooling medium from one end of the cylinder to the other, and then back again to the point at which it enters the cylinder, and that a thorough scavenging of the cylinder results when the charge of cooling air admitted to the cylinder is expelled by the piston. Because of this thorough cooling and cleaning out of the cylinder it is possible to introduce into the cylinder at the beginning of each admission period a mixture which when compressed will approach more closely the theoretically correct mixture for any given engine and condition than the ordinary charge, containing usually a considerable percentage of residual gases, etc., remaining in the cylinder from a previous charge; and this mixture, approaching more nearly the theoretically correct mixture than that usually admitted, will also be more fully compressed prior to ignition, owing to the relatively lower temperature of the walls of the cylinder, piston, etc. The advantages resulting from the addition to the four periods of the ordinary four-cycle engine of the additional periods herein described, in which each cylinder is thoroughly cooled and scavenged for each cycle of operation, are such as to permit the development of the same horse-power by each cylinder with a smaller fuel charge than in the ordinary four-cycle engine, approximately no more fuel being required to operate the present six-cycle, six-cylinder engine than is necessary for the operation of an ordinary four-cycle, four-cylinder engine similar in other respects to that shown. The power developed by such a six-cycle, six-cylinder engine is, however, considerably greater than that developed by such a four-cycle, four-cylinder engine.

What we claim is:

1. In a six-cycle internal combustion engine, the combination with a cylinder and a piston, of an air-jacket surrounding said cylinder and communicating with the outside air, and means coöperative with said cylinder and piston for successively effecting the following operations in the order named and each during a different stroke of the piston viz.—supplying, compressing and igniting a combustible charge, exhausting the burned gases, etc., admitting a charge of atmospheric air only through said air-jacket into the cylinder, and expelling said charge admixed with the residual gases.

2. In a six-cycle internal combustion engine, the combination with a cylinder and a piston, of a jacket surrounding said cylinder and having a spiral passage communicating at its opposite ends respectively with a source of fluid supply and with an admission port in the cylinder, and means coöperative with said cylinder and piston for successively effecting the following operations in the order named and each during a different stroke of the piston viz.—supplying, compressing and igniting a combustible charge, exhausting the burned gases, etc., admitting a charge of fluid through said spiral passage into the cylinder, and expelling said charge admixed with the residual gases.

3. In a six-cycle internal combustion engine, the combination with a cylinder and a piston, of a jacket surrounding said cylinder and having a pair of spiral passages for conducting respectively a combustible mixture and atmospheric air to said cylinder, and means coöperative with said cylinder and piston for successively effecting the following operations in the order named and each during a different stroke of the piston viz.—supplying through one of said spiral passages, and compressing and igniting a combustible charge, exhausting the burned gases, etc., admitting a charge of air through the other spiral passage into the cylinder, and expelling said charge admixed with the residual gases.

Signed at New York in the county of New York and State of New York this 18th day of April A. D. 1913.

PAUL H. MUELLER.
LUDWIG H. SCHULER.

Witnesses:
C. S. CHAMPION,
ANNE C. BARNES.